United States Patent
Draper et al.

(10) Patent No.: US 8,397,484 B2
(45) Date of Patent: *Mar. 19, 2013

(54) INLET SYSTEM FOR AN EGR SYSTEM

(75) Inventors: Sam D. Draper, Simpsonville, SC (US);
Douglas S. Byrd, Greer, SC (US); Carl G. Schott, Simpsonville, SC (US);
Rahul J. Chillar, Marietta, GA (US);
Amit S. Toprani, Greenville, SC (US)

(73) Assignee: General Electric Company, Schenectady, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/028,498

(22) Filed: Feb. 16, 2011

(65) Prior Publication Data

US 2011/0138767 A1 Jun. 16, 2011

Related U.S. Application Data

(62) Division of application No. 12/258,678, filed on Oct. 27, 2008, now Pat. No. 7,926,256.

(51) Int. Cl.
*F02G 5/02* (2006.01)
*F02G 7/052* (2006.01)
*F02G 7/055* (2006.01)
*F02M 35/024* (2006.01)
*F02M 25/07* (2006.01)
*B01D 50/00* (2006.01)

(52) U.S. Cl. ......... 60/39.52; 60/39.5; 60/39.12; 60/649; 60/605.2; 55/385.7

(58) Field of Classification Search ...... 60/39.52–39.53, 60/39.5, 39.12, 649, 605.2; 55/385.7; 96/189; 181/229; *F02M 25/07, 35/024; F02C 7/052, F02C 7/055*
See application file for complete search history.

(56) References Cited

U.S. PATENT DOCUMENTS

| 2,670,597 | A | * | 3/1954 | Villemejane | 60/39.52 |
|---|---|---|---|---|---|
| 2,809,811 | A | * | 10/1957 | Blomquist | 165/7 |
| 3,589,313 | A | | 6/1971 | Smith et al. | |
| 3,768,234 | A | | 10/1973 | Hardison | |
| 3,785,145 | A | | 1/1974 | Amann | |
| 3,929,434 | A | | 12/1975 | Nelson | |
| 4,024,847 | A | * | 5/1977 | Koganemaru | 123/568.2 |
| 4,095,417 | A | * | 6/1978 | Banthin | 60/39.5 |
| 4,269,806 | A | | 5/1981 | Yaguchi et al. | |
| 4,325,352 | A | | 4/1982 | Dirkes | |

(Continued)

FOREIGN PATENT DOCUMENTS

DE 2035403 B * 10/1979
JP 57073827 A1 5/1982

(Continued)

OTHER PUBLICATIONS

Machine Translation Baba et al. (Pub. Number JP 2004-124764 A), published on Apr. 22, 2004.*

*Primary Examiner* — Thai Ba Trieu
(74) *Attorney, Agent, or Firm* — Ernest G. Cusick; Frank A. Landgraff

(57) ABSTRACT

An embodiment of the present invention takes the form of a system that may recirculate a portion of the exhaust of at least one turbomachine where it may be mixed with the inlet air and re-enter the turbomachine without affecting reliability and availability of the unit. An embodiment of the present invention provides an inlet system for an exhaust gas recirculation system. This inlet system may take a variety of forms and may optimize the direction that the portion of the recirculated exhaust stream flows within the inlet system.

5 Claims, 6 Drawing Sheets

U.S. PATENT DOCUMENTS

| | | | |
|---|---|---|---|
| 4,327,698 A * | 5/1982 | Hamai et al. | 123/568.17 |
| 4,337,231 A | 6/1982 | Yaguchi et al. | |
| 4,434,613 A | 3/1984 | Stahl | |
| 4,492,085 A | 1/1985 | Stahl et al. | |
| 5,044,259 A | 9/1991 | Catan et al. | |
| 5,507,141 A | 4/1996 | Stigsson | |
| 5,590,519 A | 1/1997 | Almlof et al. | |
| 5,657,630 A | 8/1997 | Kjemtrup et al. | |
| 5,794,431 A | 8/1998 | Utamura et al. | |
| 5,863,316 A | 1/1999 | Lordo et al. | |
| 5,955,037 A | 9/1999 | Holst et al. | |
| 6,052,951 A | 4/2000 | Daoud | |
| 6,173,562 B1 | 1/2001 | Utamura et al. | |
| 6,202,400 B1 | 3/2001 | Utamura et al. | |
| 6,223,519 B1 | 5/2001 | Basu et al. | |
| 6,250,064 B1 * | 6/2001 | Tomlinson et al. | 60/775 |
| 6,260,628 B1 | 7/2001 | Magnus | |
| 6,298,664 B1 | 10/2001 | Åsen et al. | |
| 6,301,888 B1 | 10/2001 | Gray, Jr. | |
| 6,470,682 B2 | 10/2002 | Gray, Jr. | |
| 6,634,165 B2 * | 10/2003 | Tomlinson et al. | 60/39.53 |
| 6,637,183 B2 | 10/2003 | Viteri et al. | |
| 6,898,936 B1 | 5/2005 | Ochs et al. | |
| 6,923,004 B2 | 8/2005 | Chandran et al. | |
| 7,007,487 B2 | 3/2006 | Belokon et al. | |
| 7,059,118 B2 * | 6/2006 | Ripper et al. | 60/324 |
| 7,073,626 B2 * | 7/2006 | Weinhold et al. | 181/279 |
| 7,266,943 B2 | 9/2007 | Kammel | |
| 7,272,934 B2 | 9/2007 | Chandran et al. | |
| 7,285,350 B2 | 10/2007 | Keefer et al. | |
| 7,428,818 B2 * | 9/2008 | Hjerpe | 60/39.53 |
| 7,536,252 B1 | 5/2009 | Hibshman et al. | |
| 7,632,339 B2 | 12/2009 | Singh | |
| 7,703,272 B2 * | 4/2010 | Wagner et al. | 60/39.53 |
| 7,712,301 B1 * | 5/2010 | Wagner | 60/39.53 |
| 7,832,524 B2 * | 11/2010 | Mueller et al. | 181/229 |
| 7,861,511 B2 | 1/2011 | Chillar et al. | |
| 8,166,766 B2 * | 5/2012 | Draper | 60/39.52 |
| 8,261,528 B2 * | 9/2012 | Chillar et al. | 60/39.52 |
| 8,273,158 B2 * | 9/2012 | Jarrier et al. | 95/267 |
| 2003/0072648 A1 | 4/2003 | Han et al. | |
| 2005/0028529 A1 | 2/2005 | Bartlett et al. | |
| 2005/0228573 A1 | 10/2005 | Gangopadhyay | |
| 2006/0207262 A1 | 9/2006 | Firey | |
| 2007/0234702 A1 | 10/2007 | Hagen et al. | |
| 2007/0277514 A1 | 12/2007 | Kammel | |
| 2008/0202484 A1 | 8/2008 | Glatz et al. | |
| 2008/0202848 A1 * | 8/2008 | Mueller et al. | 181/229 |
| 2008/0309087 A1 | 12/2008 | Evulet et al. | |
| 2009/0013867 A1 | 1/2009 | McCutchen | |
| 2009/0218821 A1 | 9/2009 | ElKady et al. | |
| 2009/0241515 A1 | 10/2009 | Cardno | |
| 2009/0284013 A1 | 11/2009 | Anand et al. | |
| 2010/0011886 A1 | 1/2010 | Czapiewski et al. | |
| 2010/0175558 A1 * | 7/2010 | Raje et al. | 96/189 |
| 2012/0204525 A1 * | 8/2012 | Jarrier | 55/385.7 |

FOREIGN PATENT DOCUMENTS

| | | | |
|---|---|---|---|
| JP | 60187315 A * | 9/1985 | |
| JP | 2000008967 A * | 1/2000 | |
| JP | 2002332919 A1 | 11/2002 | |
| JP | 2004124764 A1 | 4/2004 | |
| JP | 2011106294 A * | 6/2011 | |
| JP | 2011179767 A * | 9/2011 | |
| KR | 2001047579 A * | 6/2001 | |
| KR | 2005106146 A * | 11/2005 | |
| WO | 9416992 A1 | 8/1994 | |
| WO | 9848160 A1 | 10/1998 | |
| WO | WO 2008072260 A1 * | 6/2008 | |

* cited by examiner

INLET SYSTEM FOR AN EGR SYSTEM

This is a divisional application claiming priority to commonly-assigned U.S. patent application Ser. No. 12/258,678, entitled "An Inlet System For An EGR System", filed Oct. 27, 2008 now U.S. Pat. No. 7,926,256; which is incorporated herein by reference in its entirety.

BACKGROUND OF THE INVENTION

The present invention relates to the exhaust gas emitted from a turbomachine, and more particularly to a system and method of utilizing a turbomachine as a prime mover of the exhaust gas recirculated within an EGR system.

There is a growing concern over the long-term effects of Nitrogen Oxides (hereinafter NOx) and Carbon Dioxide (hereinafter "$CO_2$") and Sulfur Oxides (SOx) emissions on the environment. The allowable levels of emissions that may be emitted by a turbomachine, such as a gas turbine, are heavily regulated. Operators of turbomachines desire methods of reducing the levels of NOx, $CO_2$, and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the turbomachine.

Exhaust gas recirculation (EGR) generally involves recirculating a portion of the emitted exhaust stream through an inlet system of the turbomachine. The exhaust stream is then mixed with the incoming airstream prior to combustion. The EGR process facilitates the removal and sequestration of concentrated $CO_2$, and may also reduce the NOx and SOx emission levels. The recirculated exhaust mixes with the incoming airstream to create an inlet fluid. The exhaust stream should be adequately mixed with the airstream within a portion of the inlet section.

For the foregoing reasons, there is a need for an inlet system that allows for integration with the EGR system. The inlet system should direct the recirculated exhaust stream in a manner that allows for mixing with the incoming airstream.

BRIEF DESCRIPTION OF THE INVENTION

In accordance with an embodiment of the present invention, a system for introducing an exhaust stream into a turbomachine, the system comprising: an inlet system for channeling an inlet fluid towards a compressor section of a turbomachine, wherein the inlet fluid comprises an airstream and an exhaust stream, an exhaust gas recirculation (EGR) system comprising at least one EGR skid and at least one EGR duct; wherein the at least one EGR duct is integrated with a portion of the inlet system; wherein the at least one EGR system is configured to: receive the exhaust stream at a first temperature from an exhaust section of a turbomachine; wherein the exhaust stream comprises constituents at a first level; allows for the exhaust steam to enter the EGR skid, which reduces the constituents to a second level; and allows for the exhaust stream to exit the EGR skid at a second temperature and flow through the at least one EGR duct, wherein the exhaust streams enters the inlet system.

DETAILED DESCRIPTION OF THE INVENTION

Figure 1:
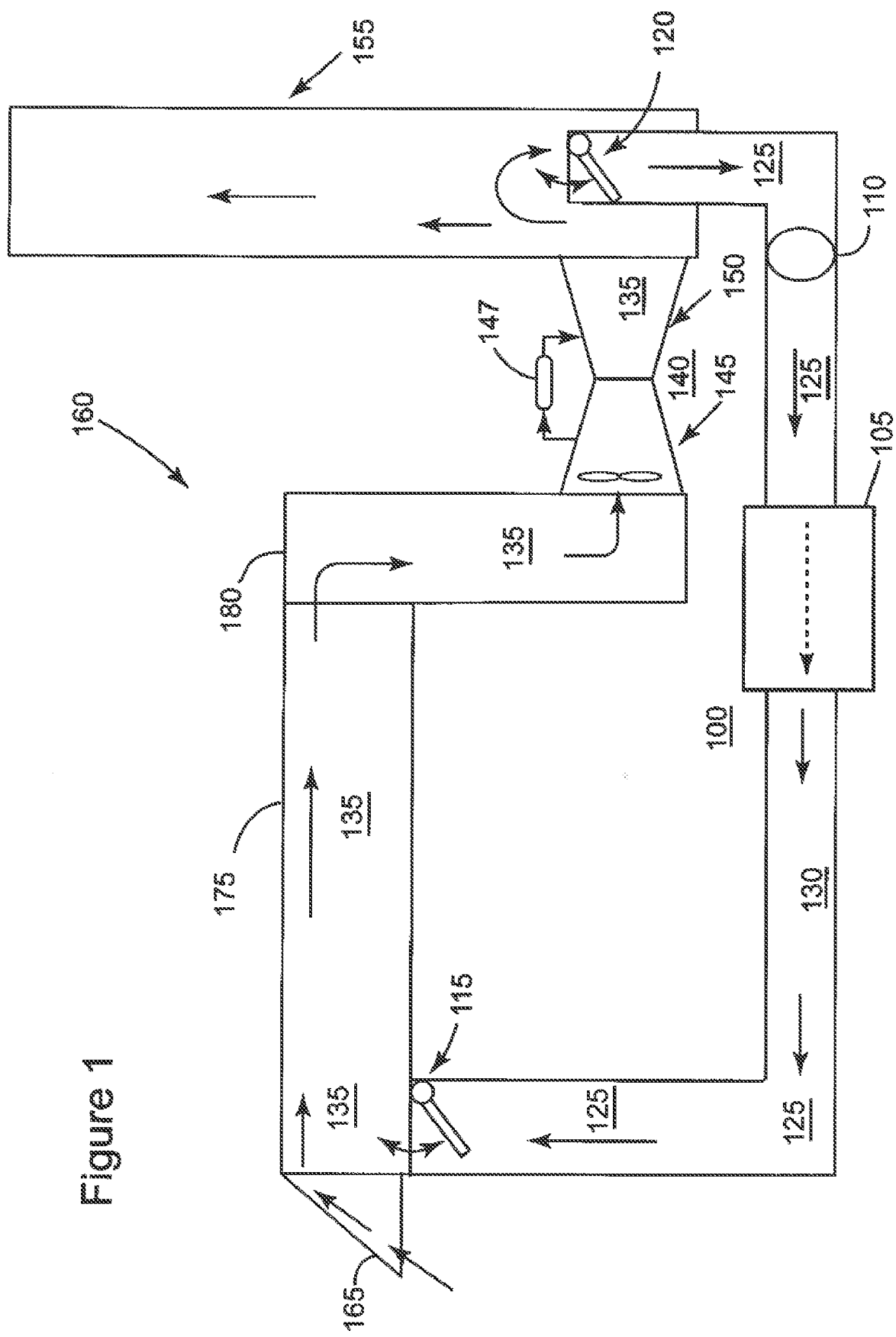
FIG. 1 is a schematic illustrating an example of an EGR system integrated with a turbomachine.

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front," "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An embodiment of the present invention takes the form of a system that may recirculate a portion of the exhaust of at least one turbomachine where it may be mixed with the inlet air and re-enter the turbomachine without affecting reliability and availability of the unit. The elements of the present invention may be fabricated of any material that can withstand the operating environment under which the EGR system may function and operate.

Generally, the exhaust gas recirculation system of an embodiment of the present invention comprises multiple elements. The configuration and sequence of the elements may be dictated by the composition of the exhaust gas. In general the steps comprising the exhaust gas re-circulation process are: cooling, scrubbing, de-misting, high efficiency particulate and droplet removal, and mixing. When the present invention is utilized, the diverted gas, blended with inlet air, can be introduced to the turbine inlet without harm. As described below, there are multiple arrangements that may be used to accomplish the exhaust gas treatment.

The present invention may be applied to the variety of turbomachines that produce a gaseous fluid, such as, but not limiting of, a heavy-duty gas turbine; an aero-derivative gas turbine; or the like. An embodiment of the present invention may be applied to either a single turbomachine or a plurality of turbomachines. An embodiment of the present invention may be applied to a turbomachine operating in a simple cycle or a combined cycle configuration.

As described below, an embodiment of the present invention may include at least one EGR skid. The at least one EGR skid may utilize at least one scrubber; or at least one scrubber and at least one downstream heat exchanger; or at least one scrubber and at least one upstream heat exchanger; or at least one scrubber, at least one downstream heat exchanger; and at least one upstream heat exchanger; or various combinations thereof. Moreover, the at least one EGR skid may also include an injector that may introduce a reagent for reducing the level of harmful constituents within the exhaust stream; and a wet electrostatic precipitator for removing the constituents.

Referring now to the Figures, where the various numbers represent like elements throughout the several views, FIG. 1 is a schematic illustrating an example of an EGR system 100 integrated with a turbomachine 140. FIG. 1 illustrates a turbomachine 140 and an EGR system 100.

The turbomachine 140 generally comprises a compressor section 145, a combustion section 147, and a turbine section 150. An inlet section 160 may be located upstream of the compressor section 145. The inlet section may comprise at least one weather hood 165, an inlet duct 175, and an inlet plenum 180. An exhaust stack 155 may be located downstream of the turbine section 150.

The EGR system 100, comprises: an EGR skid 105; an EGR flow circulation device 110; an EGR inlet damper 115; and an EGR exhaust damper 120, which may be integrated with an turbine section 150 of the turbomachine 140. The at least one EGR system 100 may be of a size and fabricated of a material capable of withstanding the physical properties of the exhaust stream 125, such as, but not limiting of, a flowrate of about 10,000 Lb/hr to about 50,000,000 Lb/hr and a temperature up to about 1500 Degrees Fahrenheit. Here, the velocity of the exhaust stream 125 may comprises a range of up to about 10,000,000 standard cubic feet per minute (SCFM). The inlet section 160 and the turbine section 150 may bound the flow path 130 of the EGR system 100.

The EGR skid 105 generally includes the component (s) of the EGR system 100 that reduces the level of aforementioned constituents from the exhaust stream 125. These component (s) may include for example, but not limiting of, at least one heat exchanger, at least one scrubber, at least one demister, or similar components, (none of which are illustrated in the Figures). The EGR flow circulation device 110 may circulate the exhaust during the operation of the EGR system 100.

Generally, during the operation of the EGR system 100, the EGR exhaust damper 120 may open to allow for the exhaust stream 125 from the turbine section 150 to enter the EGR system 100. The exhaust damper 120 may apportion the total exhaust flow between a non-recirculated exhaust and the exhaust stream 125. Then, the EGR skid 105 may reduce the level of constituents within the exhaust stream 125. Next, the EGR inlet damper 115 may open to allow for the recirculated exhaust stream 125 to enter the inlet section 160 of the turbomachine 140. The exhaust stream 125 may then mix with the inlet air entering the inlet system 160 forming an inlet fluid 135. Throughout the figures the inlet air is represented by an arrow (s) located external to the at least one weather hood 165. The inlet fluid 135 may then flow downstream to the compressor section 145 of the turbomachine 140. During the aforementioned process, the EGR flow circulation device 110 may move the exhaust stream 125 throughout the EGR system 100.

Figure 2:
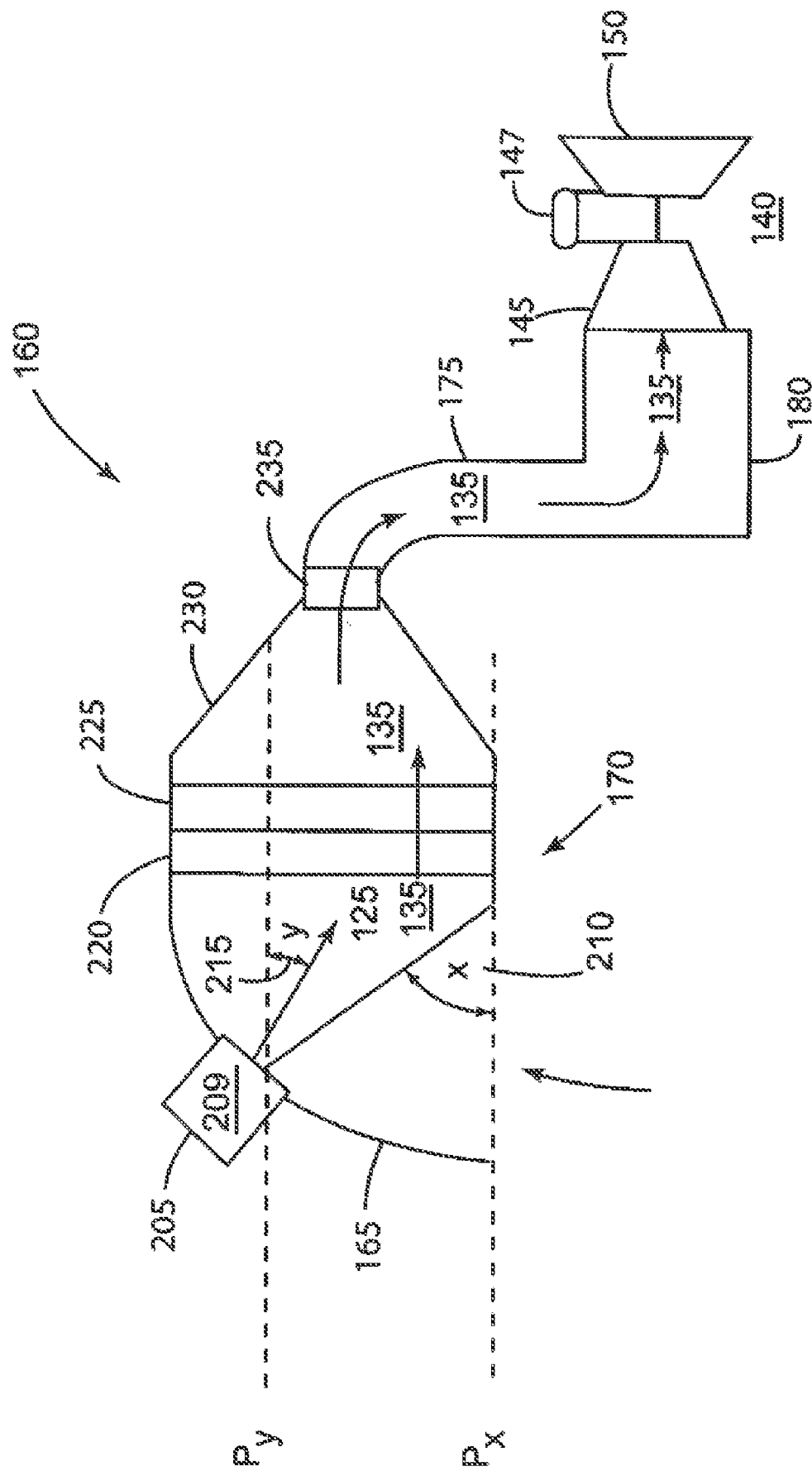
FIG. 2 is a schematic illustrating an example of an inlet system for an EGR system, in accordance with a first embodiment of the present invention.

FIG. 2 is a schematic illustrating an example of an inlet system 160 for an EGR system 100, in accordance with a first embodiment of the present invention. FIG. 2 illustrates a turbomachine 140 and a first embodiment of the inlet system 160. Here, the inlet filter system 170 comprises a first filter 220 and a second filter 225. The first filter 220 maybe located upstream of the second filter 225. In an embodiment of the present invention, the first and second filters 220, 225 may be in the form of, for example, but not limiting of, a coalescing filter, or the like.

In an embodiment of the present invention, the EGR system 100 comprises at least one EGR duct 205, which serves to introduce the exhaust stream 125 into the inlet system 160. The at least one EGR duct 205 may comprise an inlet portion (not illustrated) integrated with the EGR system 100. The inlet portion may receive the exhaust stream 125 from the EGR inlet damper 115. The at least one EGR duct 205 may comprise an outlet portion 209 integrated with the inlet system 160. The outlet portion 209 may allow for the exhaust stream 125 to flow into the inlet system 160. The at least one EGR duct 205 may be made into any shape that allows for physical integration with a portion of the inlet system 160. The at least one EGR duct 205 may be made of any material capable of withstanding the aforementioned operating environments and conditions of the EGR system 100. For example, but not limiting of, the exhaust stream 125 may flow a range of from about 300 feet/minute to about 5000 feet/minute.

In the first embodiment of the present invention, the at least one EGR duct 205 may be integrated with the at least one weather hood 165. For example, but not limiting of, a Frame 6 turbomachine 140 may comprises a single weather hood 165; whereas a Frame 9 turbomachine 140 may comprises multiple weather hoods 165

The exhaust stream 125 may enter the inlet system 160 in a region encompassed by the at least one weather hood 165, as illustrated in FIG. 2. The outlet portion 209 of the at least one EGR duct 205 may be orientated on the at least one weather hood 165 to direct and distribute the exhaust stream 125 downstream towards the inlet filter system 170. The orientation of the outlet portion 209 may allow for a nearly even temperature distribution when mixing with the airstream. The orientation of the outlet portion 209 may also reduce the possibility of obstructing the airflow entering the at least one weather hood 165. The orientation of the outlet portion 209 may allow for the inlet fluid 135 to flow symmetrically through the inlet filter system 170.

In an embodiment of the present invention, the orientation of an outlet portion 209 may be determined by an angle X 210, illustrated as "X"; and an angle Y 215, illustrated as "Y". Angle X 210 may determine the position of a central section of the outlet portion 209 relevant to plane X, illustrated as "Px". Angle Y 215 may determine the position of a central portion of the exhaust stream 125 relative to plane Y, illustrated as "Py". Also, the range of angle X 210 and angle Y 215 may be optimized to account for an exit velocity of the exhaust stream 125. This may aid in the mixing of the exhaust stream 125 with the airstream. Furthermore, angle X 210 and angle Y 215 may aid in disturbing the exhaust stream 125 in a nearly uniform manner within the inlet system 160. This distribution may reduce the chance of hotspots, or the like.

In an embodiment of the present invention, a user may optimize angle X 210 and angle Y 215 with the goal of directing the maximum amount of the exhaust stream 125 downstream towards the inlet filter system 170. Here, the optimized value of angle Y 215 and may be dependent on the optimized value of angle X 210, or vice-versa. For example, but not limiting of, angle X 210 may comprise a range of from about 0 degrees to about 90 degrees; and angle Y 215 may comprise a range of from about 0 degrees to about 45 degrees.

In use, the inlet system 160 of the first embodiment of the present invention may function as follows. The inlet system 160 may channel the airstream ingested by the compressor section 145 and mixes the exhaust stream 125 to create the inlet fluid 135, as described. The airstream usually comes from the environment in which the turbomachine 140 operates. Initially, the airstream flows around the at least one weather hood 165, which may prevent weather elements, such as rain, snow, etc, from entering the compressor section

145. The inlet fluid 135 may be created in a region where the outlet portion 209 of the at least one EGR duct 205 is connected to the at least one weather hood 165, as described. The inlet fluid 135 may then flow through an inlet filter system 170; which generally removes foreign objects and debris from the airstream. Next, the inlet fluid 135 may flow through a transition duct 230, which may comprise a silencer section 235. Next the inlet fluid 135 may flow through an inlet duct 175 and then an inlet plenum 180; these components may adjust the velocity and pressure of the airstream. The inlet plenum 180 may connect the inlet system 160 with the turbomachine 140 and allows for inlet fluid 135 to flow into the compressor section 145.

The turbomachine 140 comprises a compressor section 145 having a rotor. The operation of the turbomachine 140 generally includes the following. The inlet fluid 135 deriving from the inlet system 160 enters the compressor section 145, is compressed and then discharges to a combustion system 147, where a fuel, such as a natural gas, is burned to provide high-energy combustion gases that drives the turbine section 150. In the turbine section 150, the energy of the hot gases is converted into work, some of which is used to drive the compressor section 145.

FIGS. 3 through 6 illustrate alternate embodiments of the present invention. The discussion of each of these Figures focus on differences between the discussed embodiment and the embodiment of FIG. 2.

Figure 3:
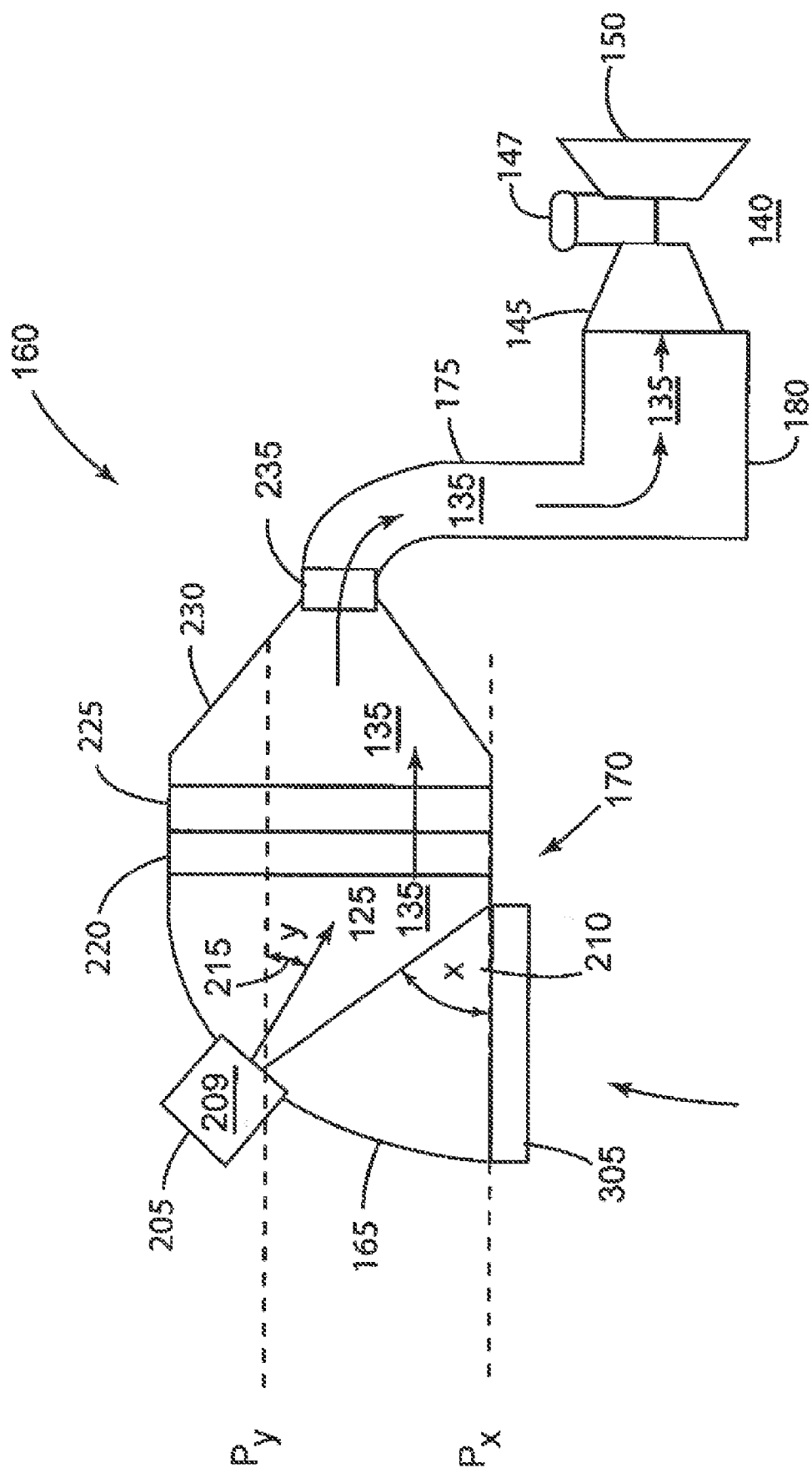
FIG. 3 is a schematic illustrating an example of an inlet system for an EGR system, in accordance with a second embodiment of the present invention.

FIG. 3 is a schematic illustrating an example of an inlet system 160 for an EGR system 100, in accordance with a second embodiment of the present invention. Here, the inlet system 160 may be modified to include a third filter 305. The third filter 305 may be located upstream of the at least one EGR duct 205. The at least one EGR duct 205, in this second embodiment may be located between the inlet filter system 170 and the third filter 305.

The third filter 305 may absorb a portion of the debris and foreign objects within the airstream entering the inlet system 160. The third filter 305 may reduce the likelihood of the exhaust stream 125 entering the inlet system 160 flowing out of the at least one weather hood 165 to the ambient environment of the turbomachine 140. The third filter 305, may aid in containing the exhaust stream 125 during a shutdown of the turbomachine 140. In an embodiment of the present invention, the third filter 305 may be in the form of, for example, but not limiting of, a coalescing filter, or the like.

Figure 4:
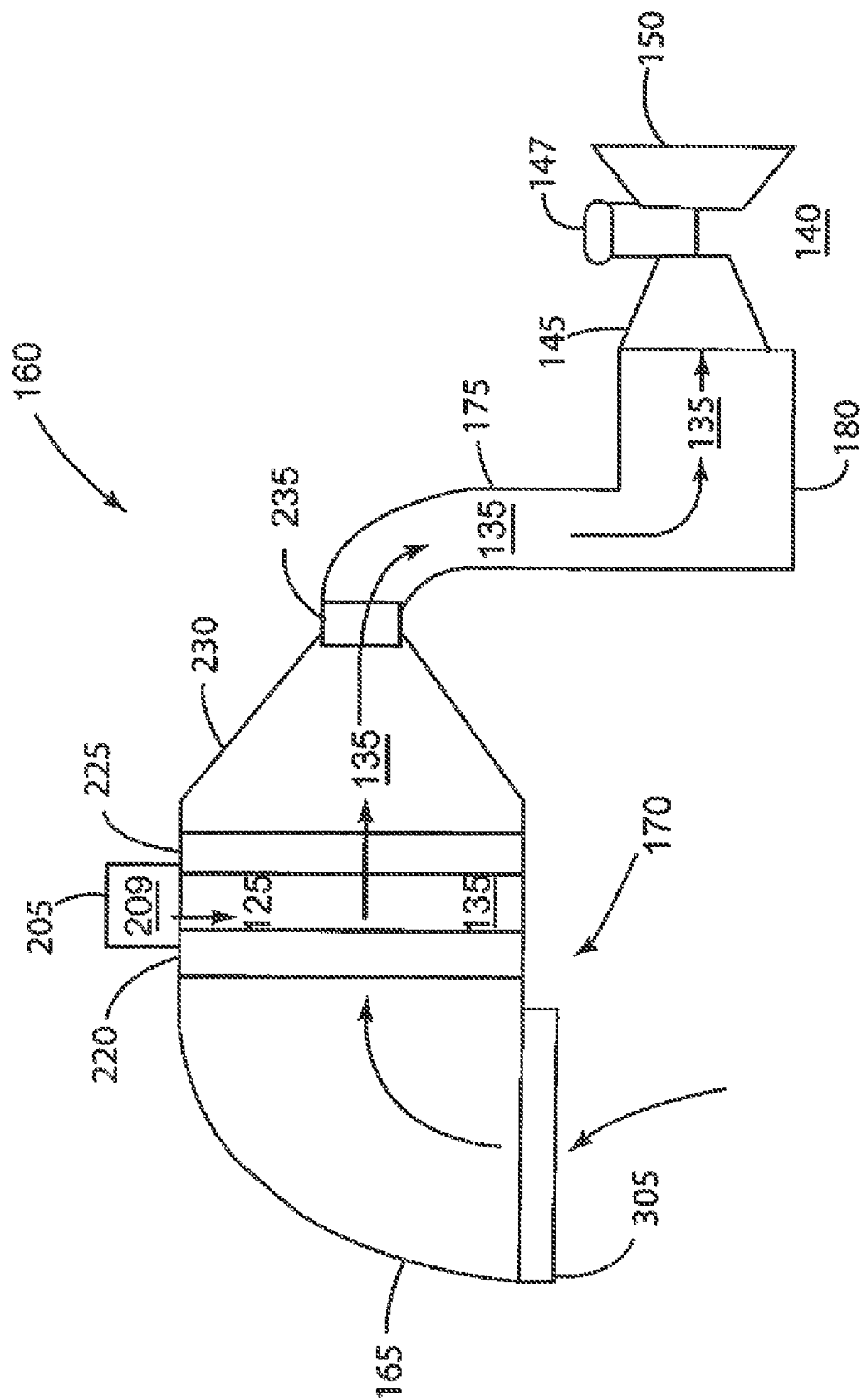
FIG. 4 is a schematic illustrating an example of an inlet system for an EGR system, in accordance with a third embodiment of the present invention.

FIG. 4 is a schematic illustrating an example of an inlet system 160 for an EGR system 100, in accordance with a third embodiment of the present invention. Here, the inlet system 160 may be modified to locate the outlet portion 209 of the at least one EGR duct 205 between the first filter 220 and the second filter 225. In this third embodiment of the present invention, the outlet portion 209 may be orientated to allow the exhaust stream 125 to be introduced into the inlet system 160 between the first filter 220 and the second filter 225.

This third embodiment of the present invention may reduce the likelihood of the exhaust stream 125 entering the inlet system 160 flowing out of the at least one weather hood 165 to the ambient environment of the turbomachine 140. The third embodiment may comprise multiple EGR ducts 205, which may distribute the exhaust stream 125 around a periphery of the inlet filter system 170. Here, the EGR ducts 205 may be positioned between the first filter 220 and the second filter 225. Alternatively, the at least one EGR duct 205 may be located at a top, bottom, or central location of the inlet filter system 170. This may aid with distributing the exhaust stream 125 in a nearly uniform manner.

Figure 5:
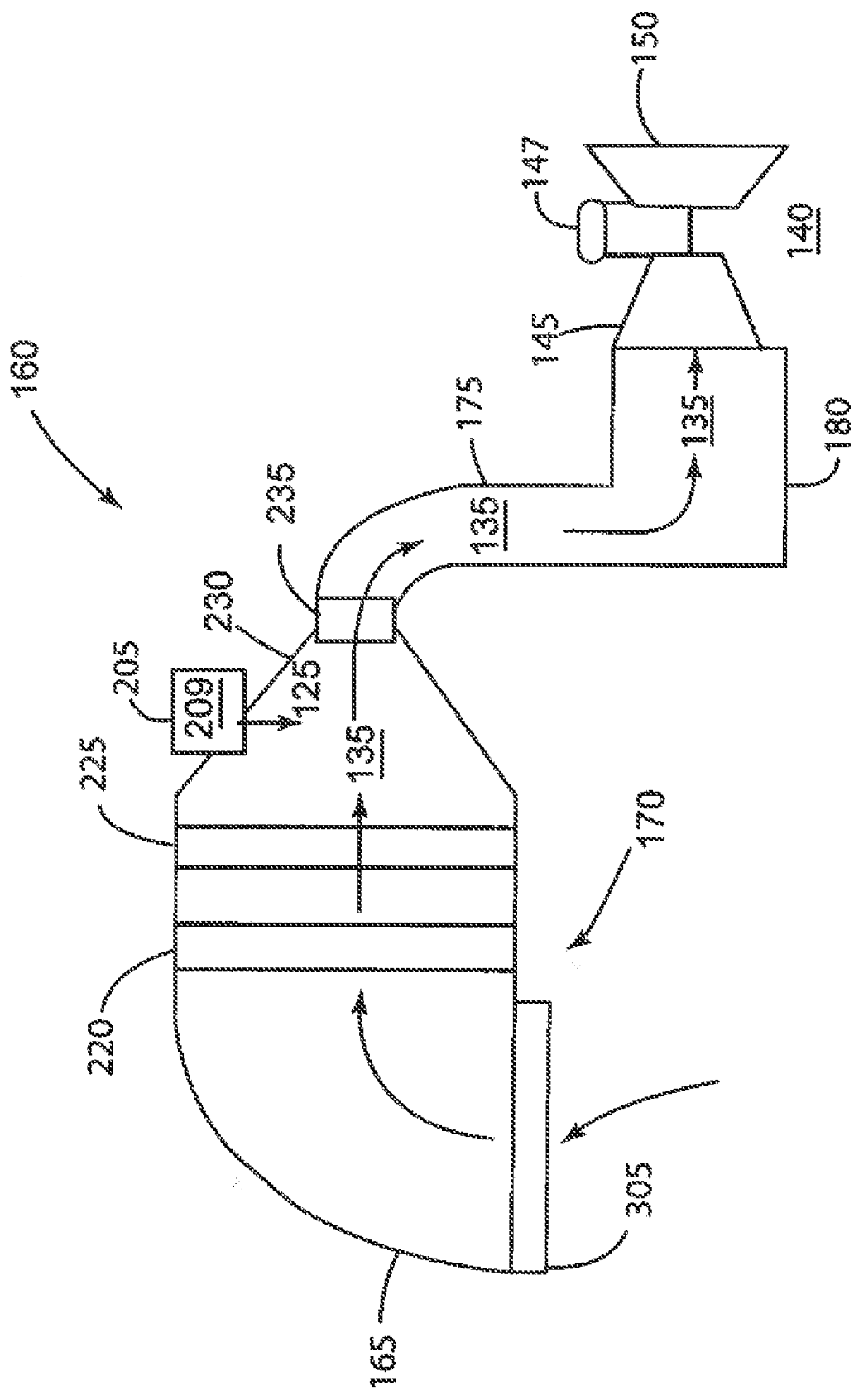
FIG. 5 is a schematic illustrating an example of an inlet system for an EGR system, in accordance with a fourth embodiment of the present invention.

FIG. 5 is a schematic illustrating an example of an inlet system 160 for an EGR system 100, in accordance with a fourth embodiment of the present invention. Here, the inlet system 160 may be modified to locate the outlet portion 209 of the at least one EGR duct 205 between inlet filter system 170 and the silencer section 235 of the transition duct 230.

The configuration of the fourth embodiment may reduce the likelihood of exhaust stream 125 flowing upstream and out of the at least one weather hood 165. The present fourth embodiment may allow for a reduction in the required supply pressure of the exhaust stream 125 exiting the at least one EGR duct 205. The present fourth embodiment may allow for a reduction in inlet equipment size located upstream of the at least one EGR duct 209.

Figure 6:
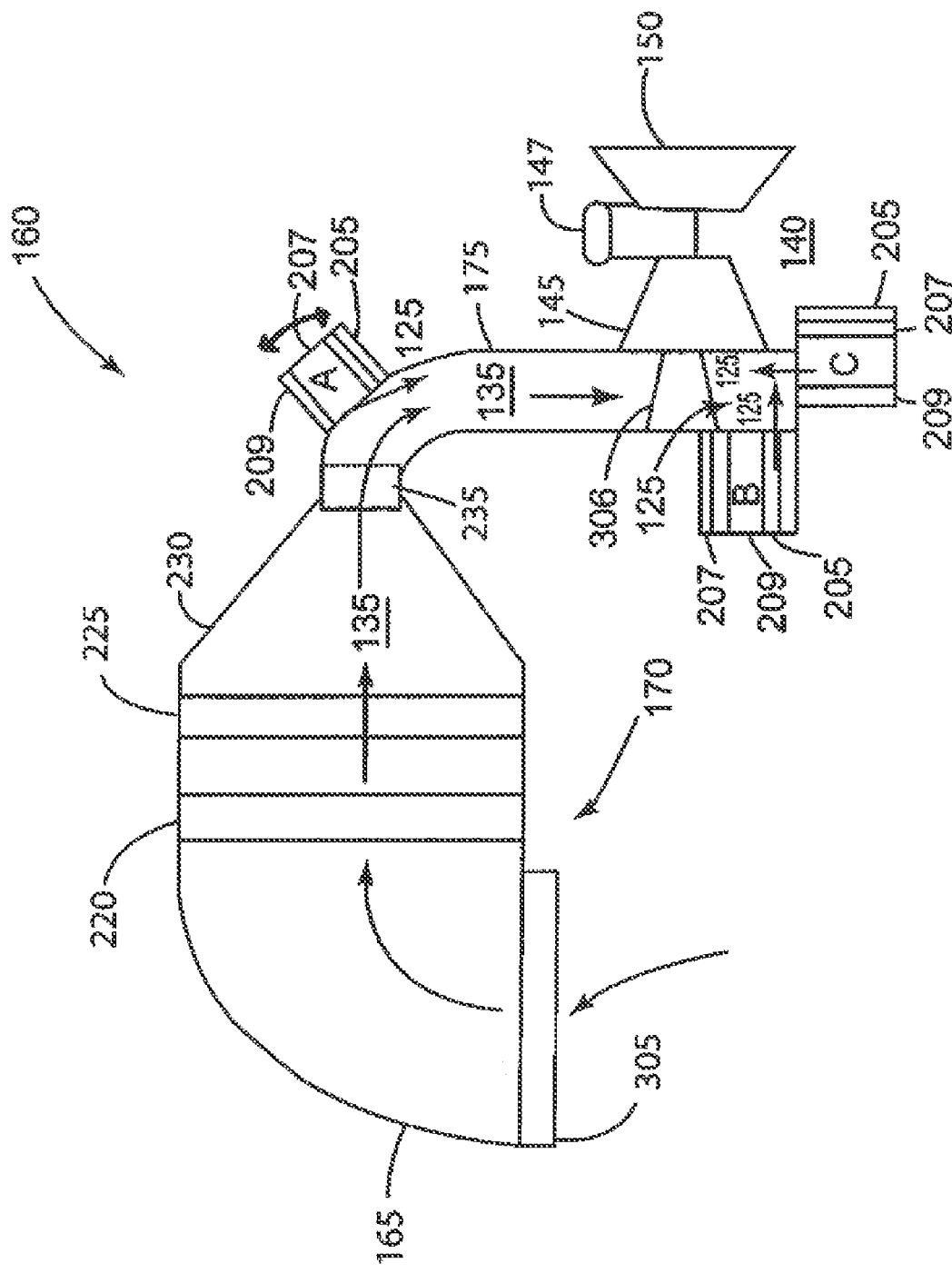
FIG. 6 is a schematic illustrating an example of an inlet system for an EGR system, in accordance with a fifth embodiment of the present invention.

FIG. 6 is a schematic illustrating an example of an inlet system 160 for an EGR system 100, in accordance with a fifth embodiment of the present invention. Here, the inlet system 160 may be modified to locate the outlet portion 209 of the at least one EGR duct 205 downstream of the silencer section 235. This may reduce the likelihood of flow distortions developing when the exhaust stream 125 and the airstream are mixed to create the inlet fluid 135.

As illustrated in FIG. 6, this fifth embodiment of the present invention may locate the outlet portion 209 of the at least one EGR duct 205 on various locations of the inlet duct 175 or the inlet plenum 180. For example, but not limiting of, these locations may be adjacent to a downstream location of the silencer section 235, illustrated as an "A"; and/or adjacent to a downstream end of the inlet plenum 180, illustrated as a "B" or "C".

In an embodiment of the present invention, locations A, B, and C may represent a location for one at least one EGR duct 205. In an alternate embodiment of the present invention, locations A, B, and C may represent positions where multiple EGR ducts 205 are integrated on the inlet system 160. For example, but not limiting of, a first EGR duct 205 may be positioned at location A; a second EGR duct 205 may be positioned at location B; and a third EGR duct 205 may be positioned at location C.

The locations of A, B, and C may depend on the compressor inlet flow field characteristics of which the inlet fluid 135. An embodiment of the present invention seeks to distribute the inlet fluid 135 in a nearly uniform manner at the entrance of the compressor section 145. Here, multiple distribution points of the inlet fluid 135 may be required to counteract flow distortions created by other flow obstructions and flow turning in the inlet system. One well-known source of flow distortion is a plenum center-body 306. Injection of exhaust stream flow 125 through walls of the center-body 306, especially toward the bottom of the plenum is one non-limiting embodiment of the present invention The fifth embodiment of the present invention may allow for a reduction in the size of some of the inlet system 160 components. Here, the inlet system 160 may be sized for the airstream flow minus the exhaust stream 125 flow, which is introduced downstream of the silencer section 235. Moreover, the pressure drop of a position of the inlet system 160 upstream of the silencer section 235 may be reduced when the exhaust stream 125 is downstream of the silencer section 235.

FIG. 6 also illustrates an alternate embodiment of at least one EGR duct 205. Here, the at least one EGR duct 205 comprises a plurality of vanes 207 for directing the flow of the exhaust stream 125. This may assist in creating the inlet fluid 135. In another alternate embodiment of the present invention, the at least one EGR duct 205 may comprise a plurality of movable vanes 207 (where movement is illustrated by the exemplary arrow in FIG. 6, and for ease of understanding, the arrow will only be illustrated once in the Figures). Here, a user may adjust the position of the movable vanes 207 to an optimized angle for directing the path of the exhaust stream 125. Although, these embodiments of the at least one EGR duct 205 are introduced in FIG. 6, the applicability is not limited to FIG. 6. These embodiments of the at least one EGR duct 205 may be applied to any of the discussed or related embodiments of the inlet system 160 of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system of introducing a recirculated exhaust stream into a turbomachine, the system comprising:
   the turbomachine comprising a gas turbine comprising: a compressor section, an external combustion system, and a turbine section; wherein the gas turbine operatively produces an exhaust stream;
   an inlet system located upstream of the compressor section, wherein the inlet system channels an inlet fluid towards the compressor section of the gas turbine, wherein the inlet fluid comprises an airstream and an exhaust stream,
   an exhaust gas recirculation (EGR) system comprising an EGR skid and an EGR duct integrated with a portion of the inlet system; wherein the EGR system operatively facilitates the sequestration and removal of concentrated $CO_2$ and reduces the level of constituents within the exhaust stream; wherein the EGR system:
      receives the exhaust stream at a first temperature from an exhaust section of the gas turbine; wherein the exhaust stream comprises the constituents at a first level;
      allows the exhaust steam to enter the EGR skid, which reduces the constituents to a second level; and
      allows the exhaust stream to exit the EGR skid at a second temperature and flow through the EGR duct, wherein the exhaust stream enters the inlet system, wherein the inlet system comprises:
   a weather hood configured to reduce an amount of precipitation entering the inlet system, wherein the weather hood comprises an opening for receiving the airstream; and
   an inlet filter system configured to reduce an amount of foreign objects entering the compressor section, wherein the inlet filter system comprises a first filter and a second filter, wherein the first and second filters are located downstream of the weather hood, and wherein the EGR duct is located between the first filter and the second filter, and is configured to allow the exhaust stream to flow between the first filter and the second filter.

2. The system of claim 1, wherein the EGR duct comprises a plurality of vanes for directing a flow path of the exhaust stream.

3. The system of claim 2, wherein the plurality of vanes are movable to change the direction of the flow path of the exhaust stream.

4. The system of claim 1, wherein the EGR duct nearly uniformly distributes the inlet fluid within the inlet system.

5. The system of claim 1, wherein the EGR duct comprises an inlet damper that opens to allow the exhaust stream to enter the inlet system and combine with the airstream.

* * * * *